(12) United States Patent
Nager

(10) Patent No.: US 8,826,665 B2
(45) Date of Patent: Sep. 9, 2014

(54) HOSE ARRANGEMENT FOR A GAS TURBINE ENGINE

(75) Inventor: Eric Andrew Nager, El Cajon, CA (US)

(73) Assignee: Hamilton Sunstrand Corporation, Windsor Locks, CT (US)

(*) Notice: Subject to any disclaimer, the term of this patent is extended or adjusted under 35 U.S.C. 154(b) by 1024 days.

(21) Appl. No.: 12/570,367

(22) Filed: Sep. 30, 2009

(65) Prior Publication Data

US 2011/0072822 A1 Mar. 31, 2011

(51) Int. Cl.
*F02G 3/00* (2006.01)
*F02C 1/00* (2006.01)

(52) U.S. Cl.
USPC .............................. 60/734; 60/739

(58) Field of Classification Search
CPC ............ F23R 3/60; F23R 3/002; F23R 3/007; F23R 3/06; F23R 3/08; F23R 3/10; F23R 3/04; Y02T 50/675; F01D 9/023; F02C 7/20; F02C 7/22; F02C 7/232; F02C 7/236
USPC ............ 60/734, 739, 796, 799, 800, 752–760
See application file for complete search history.

(56) References Cited

U.S. PATENT DOCUMENTS

| | | | |
|---|---|---|---|
| 4,046,406 A | 9/1977 | Press et al. | |
| 4,166,878 A | 9/1979 | Thompson et al. | |
| 4,322,945 A | 4/1982 | Peterson et al. | |
| 4,467,610 A * | 8/1984 | Pearson et al. | 60/739 |
| 4,535,017 A | 8/1985 | Kuckein et al. | |
| 5,139,839 A * | 8/1992 | Lim | 428/76 |
| 5,174,714 A | 12/1992 | Plemmons et al. | |
| 5,231,833 A * | 8/1993 | MacLean et al. | 60/734 |
| 5,622,438 A | 4/1997 | Walsh et al. | |
| 5,645,399 A | 7/1997 | Angus | |
| 5,976,997 A | 11/1999 | Meaney et al. | |
| 6,510,807 B2 | 1/2003 | Gottfried | |
| 6,786,052 B2 * | 9/2004 | Doody | 60/796 |
| 6,863,980 B2 | 3/2005 | Misciagna et al. | |
| 7,157,920 B2 * | 1/2007 | Barber et al. | 324/700 |
| 7,559,142 B2 * | 7/2009 | Patel et al. | 29/889.2 |
| 7,568,344 B2 * | 8/2009 | Lincourt | 60/739 |
| 2003/0111238 A1 | 6/2003 | Anderson | |

OTHER PUBLICATIONS

Thermal Ceramics, Micro-Foil Flexible Min-K Sep. 1999, p. 1.*
Eaton Hydraulics, Everflex PTFE Hose Catalog Nov. 2003, p. 6.*
Aeroquip, Aeroquip Bulletin 229A 1980, p. 1.*

* cited by examiner

*Primary Examiner* — Phutthiwat Wongwian
*Assistant Examiner* — William Breazeal
(74) *Attorney, Agent, or Firm* — Carlson, Gaskey & Olds, P.C.

(57) ABSTRACT

An example gas turbine engine hose arrangement includes a hose configured to communicate fluid and a thermal blanket directly adjacent the hose. A section of the hose is radially closer to a centerline of the gas turbine engine than the thermal blanket. An example method of limiting hose exposure to thermal energy includes routing a hose near a combustor housing of a gas turbine engine and covering the hose with thermal blanket to limit thermal energy communicated radially inwardly toward an axial center of the combustor housing.

18 Claims, 3 Drawing Sheets

HOSE ARRANGEMENT FOR A GAS TURBINE ENGINE

BACKGROUND

This application relates generally to meeting fire resistance targets for hoses in a gas turbine engine.

Gas turbine engines are known and typically include multiple sections, such as an inlet section, a compression section, a combustor section, a turbine section, and an exhaust nozzle section. The inlet section moves air into the engine. The air is compressed in the compression section. The compressed air is mixed with fuel and is combusted in combustion areas within the combustor section. Fuel hoses deliver fuel to the combustion areas. The products of the combustion expand to rotatably drive the engine.

Operators run tests on various components within the engine. A fire resistance test of a fuel hose is one example test. During the fire resistance test, thermal energy is directed at an area of the engine having the fuel hose. As known, the fuel hose fails the fire resistance test if excessive thermal energy builds up the fuel hose. Fuel moving through the fuel hose can redistribute the thermal energy directed at the area of the engine, which desirably slows thermal energy build up. Regulatory authorities sometimes require testing the fuel hose with little or no fuel moving through the fuel hose making it more difficult for the fuel hose to pass the fire resistance test.

Referring to FIG. 1, in a prior art combustor section 100, a fuel hose 104 is mounted relative to a combustion section housing 108. A thermal blanket 112 covers some of the radially outward facing surfaces of the combustion section housing 108. Portions of the thermal blanket 112 is radially positioned between the fuel hose 104 and the combustion section housing 108. Thermal energy is directed toward the combustor section 100 along direction A when testing the fire resistance of the fuel hose 104. Thus, in the prior art, the fuel hose 104 is exposed to thermal energy directed toward the combustion section 100 in direction A.

SUMMARY

An example gas turbine engine hose arrangement includes a hose configured to communicate fluid and a thermal blanket directly adjacent the hose. A section of the hose is radially closer to a centerline of the gas turbine engine than the thermal blanket.

An example combustion section arrangement in a gas turbine engine includes a combustion housing establishing an axis and a hose secured relative to the combustion section. The hose is configured to deliver a fluid to the combustion section. A thermal blanket covers a section of the hose.

An example method of limiting hose exposure to thermal energy includes routing a hose near a combustor housing of a gas turbine engine and covering the hose with thermal blanket to limit thermal energy communicated radially inwardly toward an axial center of the combustor housing.

These and other features of the example disclosure can be best understood from the following specification and drawings, the following of which is a brief description:

DETAILED DESCRIPTION

Figure 2:
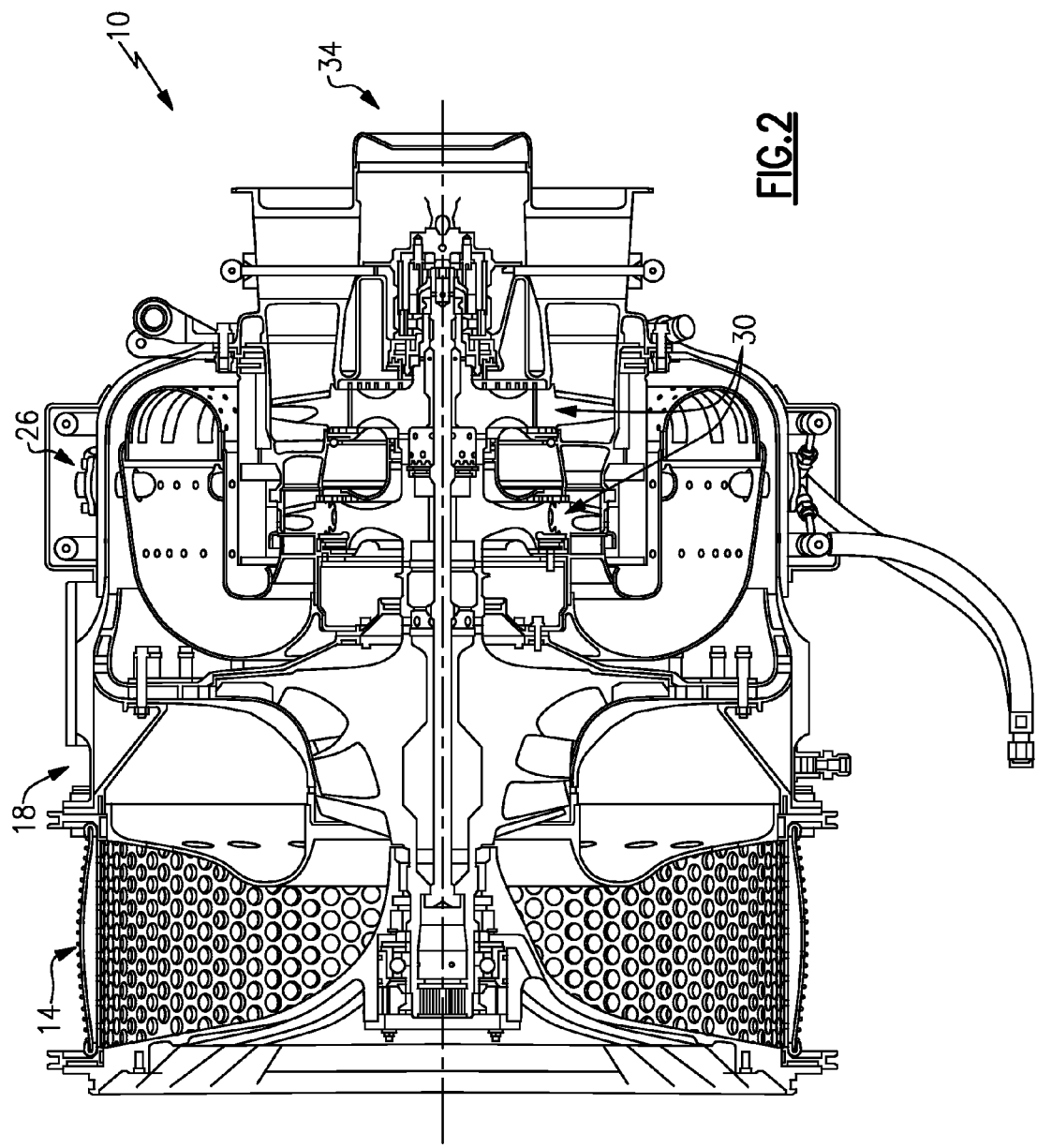
FIG. 2 is a schematic view of an example gas turbine engine.

FIG. 2 schematically illustrates an example gas turbine engine 10 including (in serial flow communication) an inlet section 14, a centrifugal compressor 18, a combustor section 26, a turbine wheel 30, and a turbine exhaust 34. The gas turbine engine 10 is circumferentially disposed about an engine centerline $X_1$. During operation, air is pulled into the gas turbine engine 10 by the inlet section 14, pressurized by the compressor 18, mixed with fuel, and burned in the combustor section 26. The turbine wheel 30 extracts energy from the hot combustion gases flowing from the combustor section 26.

In an axial design, the turbine wheel 30 utilizes the extracted energy from the hot combustion gases to power the centrifugal compressor 18. The examples described in this disclosure are not limited to the axial turbine type auxiliary power units described and may be used in other architectures, such as radial designs. That is, there are various types of engines that could benefit from the examples disclosed herein, which are not limited to the axial turbine design shown.

Figure 1:
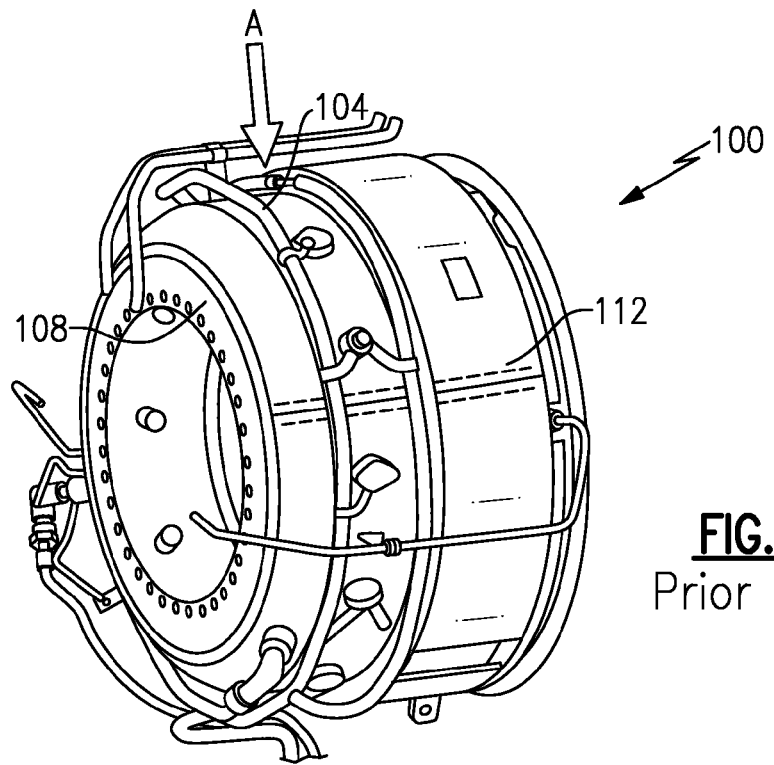
FIG. 1 shows a perspective view of the combustion section in a prior art gas turbine engine.
Figure 3:
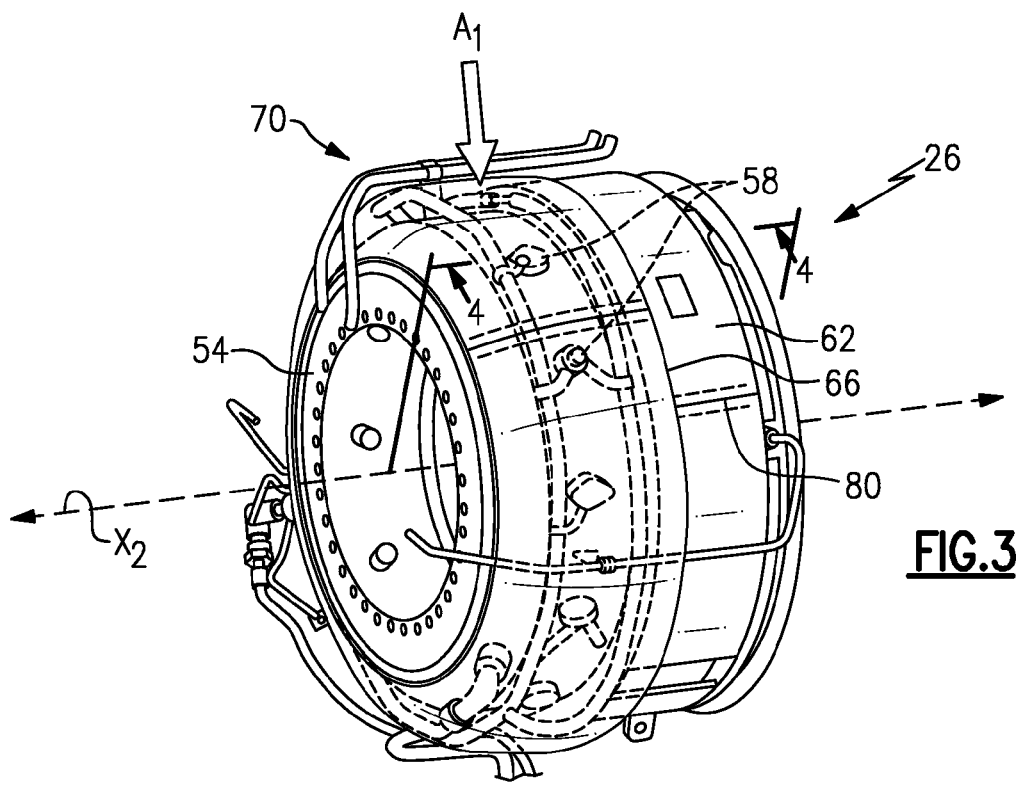
FIG. 3 shows a perspective view of the combustor section in the FIG. 2 engine.
Figure 4:
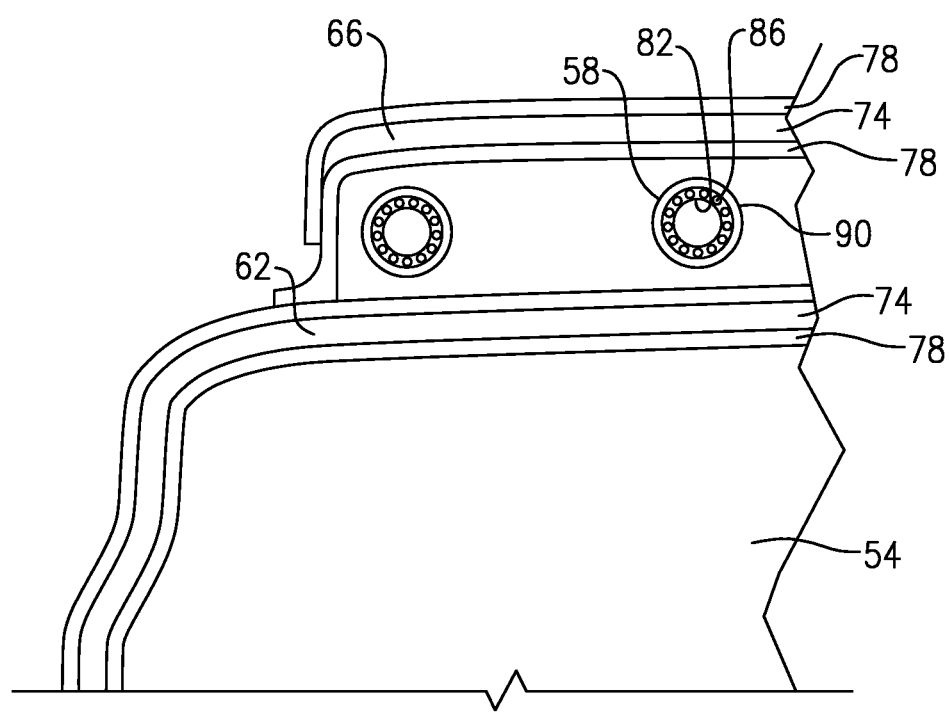
FIG. 4 shows a sectional view of the combustor section at line 4-4 of FIG. 3.

Referring to FIGS. 3 and 4 with continuing reference to FIG. 2, an example combustor section 26 of the engine 10 includes a combustor housing 54 establishing an axis $X_2$. In this example, a plurality of fuel hoses 58 are routed to communicate fuel to combustion areas (not shown) within the combustor housing 54. Other examples include fuel hoses 58 communicating fluids other than fuel. In this example, the fuel hoses 58 are mounted to radially outwardly facing surfaces of the combustor housing 54.

During a fire resistance test of the fuel hoses 58, thermal energy is applied to the combustor section 50 at an area $A_1$. Thermal energy is applied to other areas of the combustor section 50 in other examples.

In this example, a first thermal blanket 62 covers a radially outer portion of the combustor housing 54. A second thermal blanket 66 covers a section 70 of the fuel hoses 58, and particularly the section 70 near the area $A_1$. The second thermal blanket 66 thus blocks some thermal energy movement to the section 70 of the fuel hoses 58 during the fire resistance testing. The second thermal blanket 66 can be adjusted to cover other sections of the fuel hoses 58.

In this example, the first thermal blanket 62 is positioned radially between the section 70 of the fuel hoses 58 and the combustor housing 54. The second thermal blanket 66 is radially outside the section 70 of the fuel hoses 58. The section 70 of the fuel hoses 58 is thus sandwiched between the first and the second thermal blanket 62, 66.

The example first and second thermal blankets 62, 66 each contain a fabric layer 74 sandwiched between opposing stainless steel layers 78. Other examples replace the fabric layer 74, the stainless steel layers 78, or both with other types of thermal barriers. The stainless seal layers 78 reflect thermal energy radially outwardly away from the section 70 of the fuel hoses 58. The fabric layer 74 absorbs some of the thermal energy that would have otherwise reached the section 70 of the fuel hoses 58. The first and second thermal blankets 62, 66 are flexible in this example, which facilitates positioning them against the combustor housing 54.

In this example, the first and second thermal blankets 62, 66 are spaced from the section 70 of the fuel hoses 58. The first and second thermal blankets 62, 66 include multiple sections, such as three sections, in this example to facilitate assembly. The example sections of the first and second thermal blankets 62, 66 are held in place with capstans 80 and lockwire.

The example fuel hoses 58 include a Teflon inner layer 82, a braided wire middle layer 86, and a silicone outer layer 90. Although the fuel hoses 58 are described as communicating fuel, other examples include hoses that communicate other types of fluids.

Features of this invention include a hose arrangement providing greater fire resistance than prior art hose arrangements without complicated reroutings or increasing the size of the silicone outer layer.

Although a preferred embodiment has been disclosed, a worker of ordinary skill in this art would recognize that certain modifications would come within the scope of this invention. For that reason, the following claims should be studied to determine the true scope and content of this invention.

We claim:

1. A gas turbine engine hose arrangement comprising:
   a hose configured to communicate fluid, the hose positioned radially outside an annular gas turbine engine housing of a gas turbine engine, the gas turbine engine having a centerline and a radial section spanning the centerline; and
   a thermal blanket directly adjacent the hose and positioned against an outer surface of the gas turbine housing, wherein a section of the hose is radially closer to a centerline of the gas turbine engine than the thermal blanket,
   wherein a cross-section of the hose within the radial section has a circular profile,
   wherein a cross-section of the thermal blanket within the radial section has a shape that is distinct from a shape of the cross-section of the hose.

2. The gas turbine engine hose arrangement of claim 1, wherein the section of the hose is in a combustor section of the gas turbine engine.

3. The gas turbine engine hose arrangement of claim 1, including a second thermal blanket closer to the centerline of the gas turbine engine than the section of the hose.

4. The gas turbine engine hose arrangement of claim 1, wherein the section of the hose is circumferentially arranged about the engine centerline.

5. The gas turbine engine hose arrangement of claim 1, wherein the section of the hose comprises a braided wire sandwiched by a Teflon inner layer and a Silicone outer layer.

6. The gas turbine engine hose arrangement of claim 1, wherein the thermal blanket is a flexible thermal blanket that is separate and distinct from the hose.

7. A combustion section arrangement in a gas turbine engine comprising:
   a centerline of the gas turbine engine;
   a radial section of the gas turbine engine spanning the centerline;
   a combustion section including an outermost combustion housing;
   a hose secured relative to the combustion section and positioned radially outside the combustion housing, the hose configured to deliver a fluid to the combustion section; and
   a thermal blanket covering a section of the hose and positioned against an outer surface of the annular combustion housing, wherein the thermal blanket extends axially upstream past an outermost layer of the hose and extends axially downstream past the outermost layer of the hose,
   wherein a cross-section of the hose within the radial section has a circular profile,
   wherein a cross-section of the thermal blanket within the radial section has a shape that is distinct from the cross-section of the hose.

8. The combustion section arrangement of claim 7, wherein the thermal blanket is a first thermal blanket including a portion positioned radially outside both the hose and the combustion section, and including a second thermal blanket positioned radially between the hose and the combustion housing.

9. The combustion section arrangement of claim 7, wherein the thermal blanket comprises a thermal barrier layer positioned between stainless steel layers.

10. The combustion section arrangement of claim 9, wherein the thermal barrier layer comprises cloth material.

11. The combustion section arrangement of claim 7, wherein the thermal blanket is a flexible thermal blanket.

12. A method of limiting hose exposure to thermal energy comprising:
   a) routing a hose radially outside a combustor housing of a gas turbine engine; and
   b) covering the hose with a thermal blanket to limit thermal energy communicated radially inwardly toward an axial center of the combustor housing, the thermal blanket separate and distinct from the hose and positioned against an outer surface of the annular gas turbine housing,
   wherein a radial section of the gas turbine spans a centerline of the gas turbine engine,
   wherein a cross-section of the hose within the radial section has a circular profile, and further wherein a cross-section of the thermal blanket within the radial section has a shape that is distinct from the cross-section of the hose.

13. The method of limiting hose exposure to thermal energy of claim 12, including flexing the thermal blanket relative to the hose when covering the hose.

14. The method of limiting hose exposure to thermal energy of claim 12, wherein the hose is a fuel hose.

15. The method of limiting hose exposure to thermal energy of claim 12, including securing the hose relative to the combustor housing against another thermal blanket.

16. The gas turbine engine hose arrangement of claim 1, wherein the thermal blanket is spaced from an outermost layer of the hose.

17. The gas turbine engine hose arrangement of claim 1, wherein the hose is a structure including multiple layers, an outermost layer of which is Silicone.

18. The combustion section arrangement of claim 8, wherein the first and second thermal blankets are separate and distinct from each other and from the hose.

* * * * *